United States Patent [19]

Hayakawa

[11] Patent Number: 4,645,902

[45] Date of Patent: Feb. 24, 1987

[54] AUTOMATIC CIRCUMFERENTIAL WELDING APPARATUS

[75] Inventor: Yoshitaka Hayakawa, Aichi, Japan

[73] Assignee: Mitsubishi Denki Kabushiki Kaisha, Japan

[21] Appl. No.: 728,535

[22] Filed: Apr. 29, 1985

[30] Foreign Application Priority Data

Apr. 27, 1984 [JP] Japan .................................. 59-84041

[51] Int. Cl.[4] .............................................. B23K 9/12
[52] U.S. Cl. ............................ 219/125.11; 219/60 A; 901/42
[58] Field of Search ..................... 219/60 R, 60 A, 61, 219/125.1, 125.11, 125.12; 901/42

[56] References Cited

U.S. PATENT DOCUMENTS 4,144,992  3/1979  Omae et al. ..................... 219/125.11
4,163,886  8/1979  Omae et al. ..................... 219/125.11
4,283,617  8/1981  Merrick et al. ....................... 219/61

Primary Examiner—Clifford C. Shaw
Attorney, Agent, or Firm—Sughrue, Mion, Zinn, Macpeak, and Seas

[57] ABSTRACT

An automatic welding apparatus for performing welding along the circumference of abutted pipe ends, wherein the apparatus can be taught and operate in accordance with data related to reference positions and welding paths along semicircumferences of the abutted ends. A welding head is driven along a guide attached to one of the two pipes. The welding head is first positioned to reference points and then moved along the guide in two upward directions to the ends of welding lines, thereby to teach the apparatus the welding operations to be performed. Subsequently, the apparatus is operated to carry out welding in accordance with the instructed operations.

9 Claims, 5 Drawing Figures

AUTOMATIC CIRCUMFERENTIAL WELDING APPARATUS

BACKGROUND OF THE INVENTION

The present invention relates to an automatic circumferential welding apparatus for welding together cylindrical objects while moving along the circumference of the abutted ends of the objects employing an arc welding technique using a consumable electrode. More particularly, the invention relates to an automatic circumferential welding apparatus capable of being taught instructions concerning welding lines associated with plural welding directions and individual points at which the generation of an electric arc should be started and stopped.

In the case of MIG welding applied, for instance, to butt welding around the circumferences of pipes, although no problem is posed when the welding torch is moved upward, a drippy molten pool causes difficulties when the welding torch is moved downward. Consequently, it is common to employ an upward movement split welding technique whereby the torch is always moved upwardly for welding, that is, in clockwise and counterclockwise directions in half circles.

FIG. 1 is a schematic side view illustrating the positional relation between a welding torch and a groove in terms of their relative positions when the edges of abutted pipes are being welded together using a conventional circumferential welding apparatus. In FIG. 1, there are shown pipes 1 to be welded, a groove 2, a welding head 3, a welding torch 4 attached to the welding head 3, a wire reel 5 attached to the welding head 3, and a guide rail 6. A rail 6 is fixed to one of the pipes 1, and the welding head 3, driven by a driving motor, is guided along the rail 6 around the circumference of the pipe 1 in the direction perpendicular to the longitudinal, central axis of the pipe 1. For purposes of the present discussion, the direction of upward movement in FIG. 1 is defined as the X direction. As the welding head 3 moves in the X direction, the welding torch 4 is moved in the X direction. The welding torch 4 is also moved in the Y direction, herein defined as the direction perpendicular to the groove 2, and in the Z direction, that is, the direction perpendicular to the X and Y directions. Thus, the movement of the welding torch 4 is controlled in the X, Y and Z directions so that welding can be carried out by moving the welding torch 4 along the groove, that is, along the welding line.

Due to the fact that it is difficult to arrange the guide rail 6 completely parallel to the groove 2 and perpendicular to the central axis of the pipe 1, it is often necessary to manually adjust the position of the torch 4, particularly, the position in the Y direction, while observing the welding arc. In other words, there is a disadvantage in the welding method described above in that, because much care must be exerted in controlling the positions of the welding torch and the welding line, welding operations performed therewith are generally inefficient.

SUMMARY OF THE INVENTION

It is therefore an object of the present invention to eliminate the aforementioned problems by providing an automatic, upward-movement, split-circumference welding apparatus capable of carrying out circumferential welding automatically and efficiently.

It is another object of the present invention to provide an automatic, upward-movement, split-circumference welding apparatus capable of being taught and operating in accordance with individual points at which the generation of an electric arc should be started and stopped in plural directions for use in pipe joint welding.

It is still another object of the present invention to provide an automatic, upward-movement, split-circumference welding apparatus capable of being taught and operating in accordance with instructions concerning welding lines in plural welding directions.

In order to accomplish the above objects, the welding apparatus according to the present invention includes a welding head for performing arc-welding around the entire circumference of abutted cylindrical objects by movement in both clockwise and counterclockwise directions, a welding power supply, a control for controlling the head and the welding power supply, cables and position detecting means for detecting the movement of the welding head in the welding direction, the upward and downward movements of the welding torch, and its movement in the direction of the width of the groove, the automatic circumferential welding apparatus being capable of being taught and operating in accordance with instructions concerning both upward-clockwise and upward-counterclockwise welding directions, and also capable of being taught and operating in accordance with individual points at which the generation of an electric arc should be started and stopped.

DESCRIPTION OF THE PREFERRED EMBODIMENTS

Figure 1:
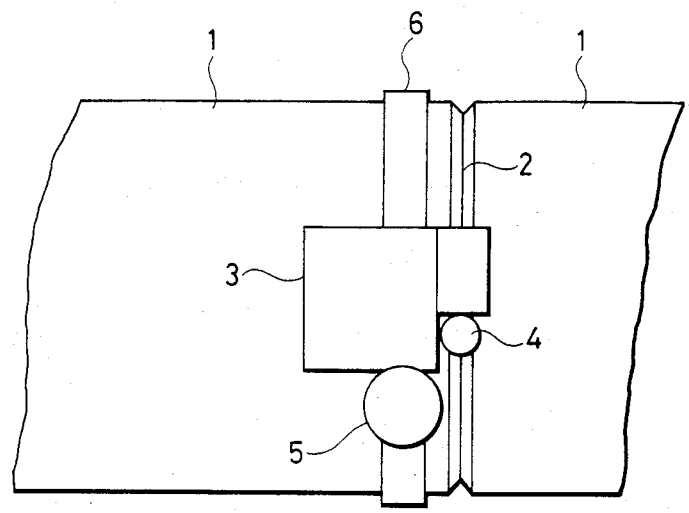
FIG. 1 is a schematic side view illustrating the relation between a welding torch and a groove in terms of their relative positions when the circumferences of pipes are welded together using a conventional circumferential welding apparatus.

Referring now to the drawings, a preferred embodiment of a welding apparatus of the present invention will be described.

Figure 3:
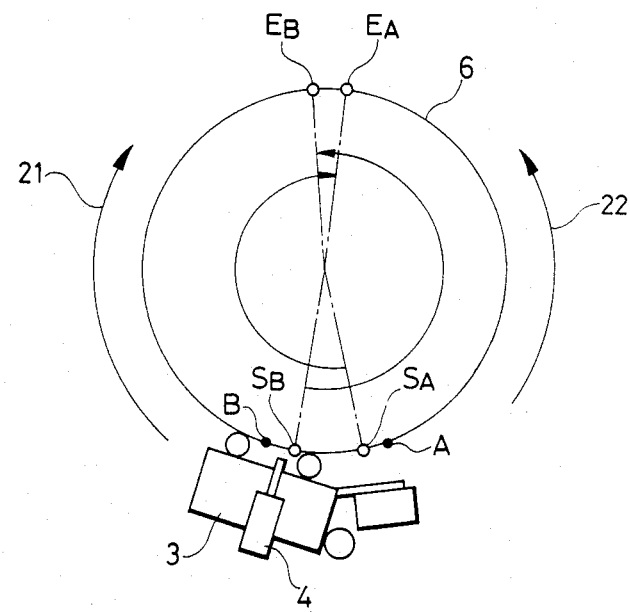
FIG. 3 is a schematic, cross-sectional view descriptive of reference points.
Figure 2:
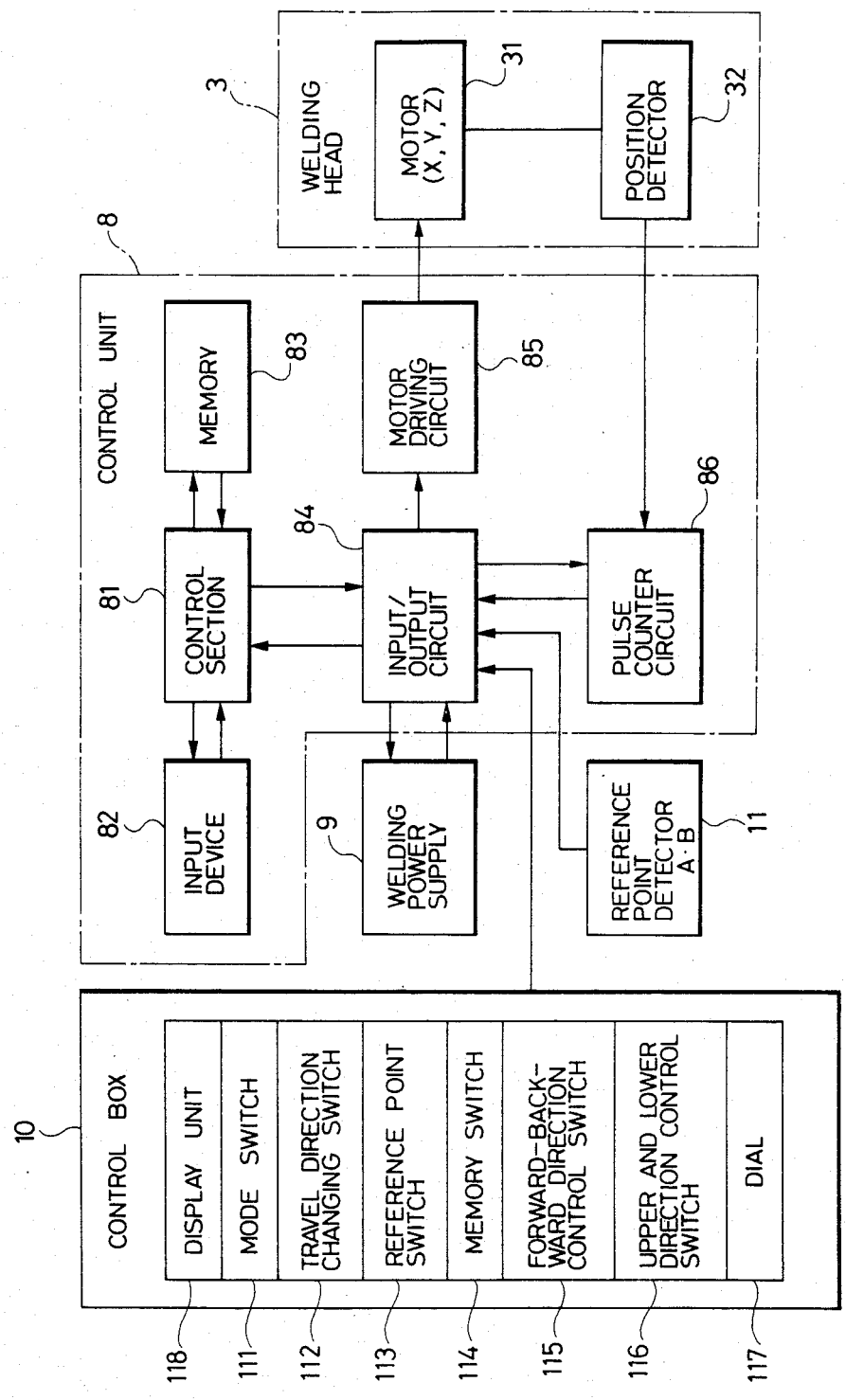
FIG. 2 is a block diagram illustrating the construction of a control unit in a preferred embodiment of a welding apparatus of the present invention.

FIG. 2 is a block diagram illustrating the construction of a control unit used in a welding apparatus embodying the present invention, and FIG. 3 is a block diagram descriptive of reference points used for teaching instructions and in subsequent execution of such instructions in the apparatus of the present invention.

In this apparatus, the points at which an electric arc is generated and stopped are individually established in both directions in welding. As illustrated in FIG. 3, as the welding head is moved around the circumference of the abutted ends of two pipes in upward clockwise and counterclockwise upward paths 21 and 22 indicated by arrows in FIG. 3, the apparatus is taught:

(1) an arc generating point SA and an arc terminating point EA in the case of clockwise upward movement along the path 21, and (2) an arc generating point SB and an arc terminating point EB in the case of counterclockwise upward movement along the path 22. Also, the apparatus is taught information concerning the welding lines covering the distance between SA and EA and that between SB and EB.

In FIG. 2, there is shown a system block diagram of the inventive welding apparatus, which includes a welding head 3 equipped with a welding torch; a motor train 31 composed of a motor for driving the welding head 3 in the X direction, a motor for driving the welding torch in the Y direction, and a motor for driving the torch in the Z direction; and position detectors 32 connected to the respective motors. In this embodiment of the invention, pulse encoders are provided for detecting movement in the X and Z directions, whereas a linear potentiometer is used for detecting movement in the Y direction. The apparatus further includes a control unit 8 for controlling the welding head 3, a welding power supply 9, a control box 10, and a reference point detector 11.

The control unit 8 includes: a control section implemented with a CPU such as a microprocessor as a principal component; an input device 82 such as a keyboard and display unit for inputting welding conditions such as a peak current value, a base current value, a welding voltage, a head movement rate, a current rise time, and a current fall time, wherein data is displayed on the display unit upon operation of the keyboard; a memory 83 for storing a program processed by the control unit 81, the taught data, and data inputted via the input device 82; an input/output circuit 84 for exchanging data for the control section 81 and various assemblies of the control unit 8, instructing the welding power supply 9 to supply power, and receiving signals indicating the generation of arcs; a motor driving circuit 85 for sending a driving signal to the motor 31 of the welding head 3; and a pulse counter circuit 86 for counting pulses upon receipt of a signal from the position detector 32 as the welding head 3 moves and transmitting the counting result to the control unit 81 through the input/output circuit 84.

A reference point indicator is provided on the guide rail 6, and the welding head is moved to this position to reset the counted value upon operation of the reference point detector 11. In FIG. 3, A designates the reference point along the upward path 22, and B the reference point along the upward path 21. SA is a point (a taught origin) where the generation of the arcing is started along the path 22, EA is a point where welding is terminated along the path 22, SB is a point (a taught origin) where the generation of the arcing is started along the path 21, and EB is a point where welding along the path 21 is terminated (end of arcing). Each of the positions SA, EA, SB, and EB is stored in the form of a number of pulses from the corresponding reference point A or B.

The control box 10, which includes a key switch, a regulating dial, a display lamp, etc., is used to control operations necessary for welding, including teaching, carrying out previously taught operations (hereinafter referred to as "regenerating"), starting and stopping welding, effecting emergency stopping, adjusting the welding velocity and welding voltage. Teaching and regenerating operations with the control box 10 will now be described.

The control box 10 includes a mode switch 111 for selecting among teaching, regenerating, and normal modes; a travel direction changing switch 112 for selecting the direction of movement of the welding head 3 around the pipe; a reference point switch 113 for establishing the reference points; a memory switch 114 for instructing the storing of taught values; and forward-backward direction control switches 115 for moving the welding head 3 forward and backward in the X direction; upper and lower direction control switches 116 for moving the welding torch upward and downward in the Z direction; a dial 117 for moving the welding torch in the Y direction; and a display unit 118 for displaying which mode (teaching, regenerating, etc.) has been selected and in which direction the welding head 3 is moving. The display unit may be implemented with display lamps, a character display, etc.

The operation of the control box will subsequently be described.

A description will first be given of the setting of the reference points A and B. When the reference point set switch 113 is turned on, the welding head 3 will move in the direction opposite to the travel direction set by the travel direction changing switch 112 and stop at the reference point 11. That is, if the travel direction is set coincident with the upward direction along the path 22, the welding head 3 will move in the direction opposite to what is indicated by the arrow 22 and stop at the point A. The pulse count value of the pulse count circuit 86 is then reset, thus setting the reference point A. Subsequently, after the travel direction changing switch 112 is set to establish the reference point B, the reference point set switch 113 is operated to set the reference point B. In this case, the mode may be either "teaching" or "regenerating." That is, if the reference point switch 113 is pressed, the welding head 3 will turn in the direction opposite to the travel direction set by the travel direction changing switch 112, and simultaneously with the application of a reference point signal to the CPU, stop the welding head and reset the pulse counter circuit 86.

After the mode is set to the "teaching" mode using the mode switch 111, there are provided several teaching items concerning the arc starting point SA, the welding terminating point EA, and the welding line between SA and EA along the path 22. This teaching is carried out by manipulating the switch 115, the switch 116, and the dial 117 to move the welding torch to the target position, and then operating the memory switch 114. A series of such operations is employed to teach SB, EB, and the welding line between SB and EB.

Figure 4:
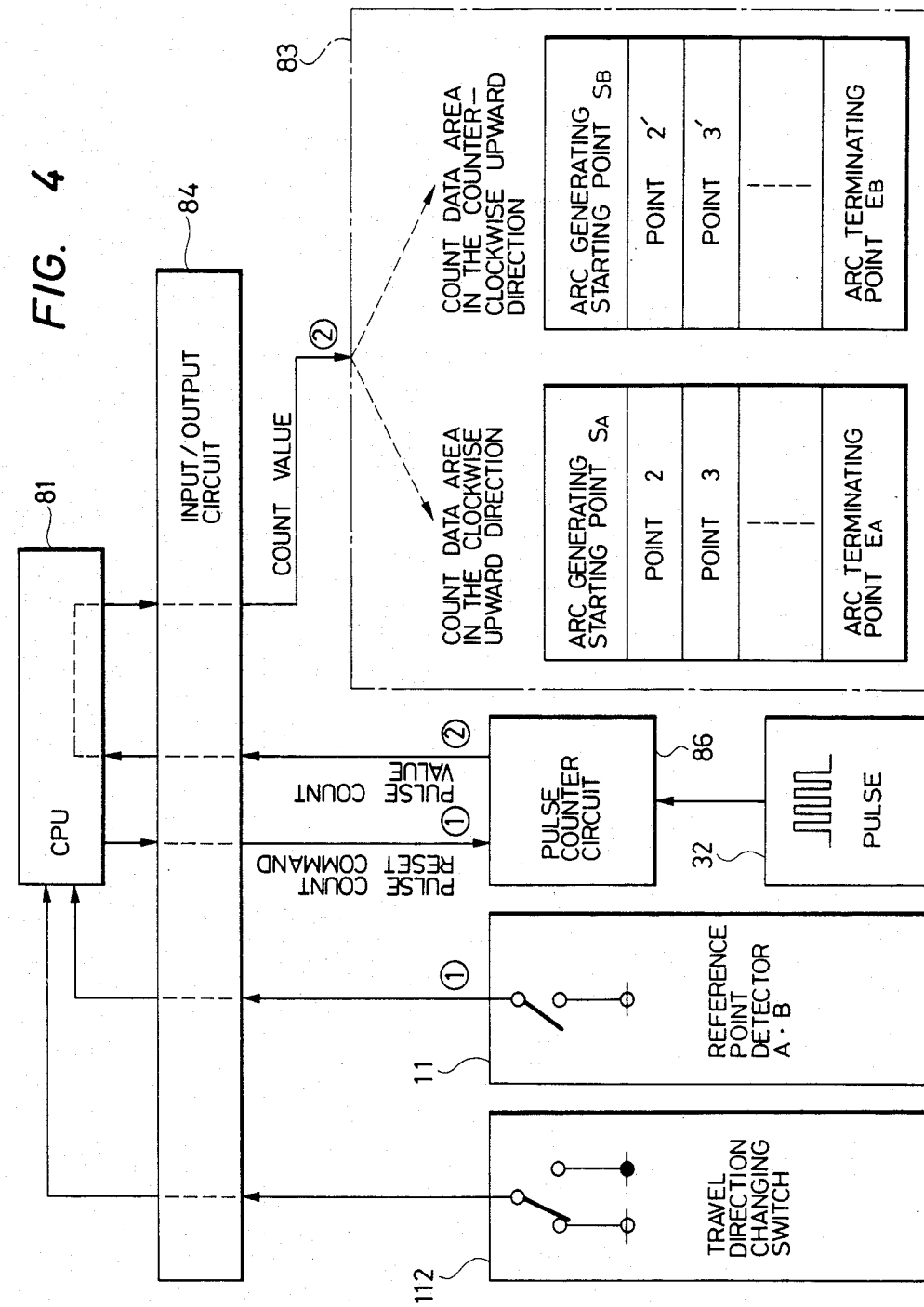
FIG. 4 is a block diagram illustrating a teaching method used with the inventive welding apparatus.

In case the travel direction changing switch 112 is set to the clockwise upward direction (path 21), as shown in the block diagram of FIG. 4:

(1) The reference point signal applied to the CPU is a single-bit signal. When the reference point switch is pressed, the welding head will be moved to the reference point A in the manner described above, whereupon the reference point signal is set to the "1" (active or ON state). At this time, the CPU sends a pulse count reset command to the pulse counter circuit.

(2) When the welding head is then moved to the arc generating starting point SA, for teaching purposes, the CPU will operate to store the pulse count value in the count data area in the clockwise upward direction as instructed by the travel direction changing switch (with the clockwise upward direction corresponding to the ON direction of the switch). In this manner, the locus up to the arc terminating point EA is stored.

The position to which the welding head is moved from the reference point is thus taught.

In the regenerating mode, welding is then carried out after the taught points have been corrected.

The operations referred to above are controlled by the control unit 81 based on the prestored program.

Figure 5:
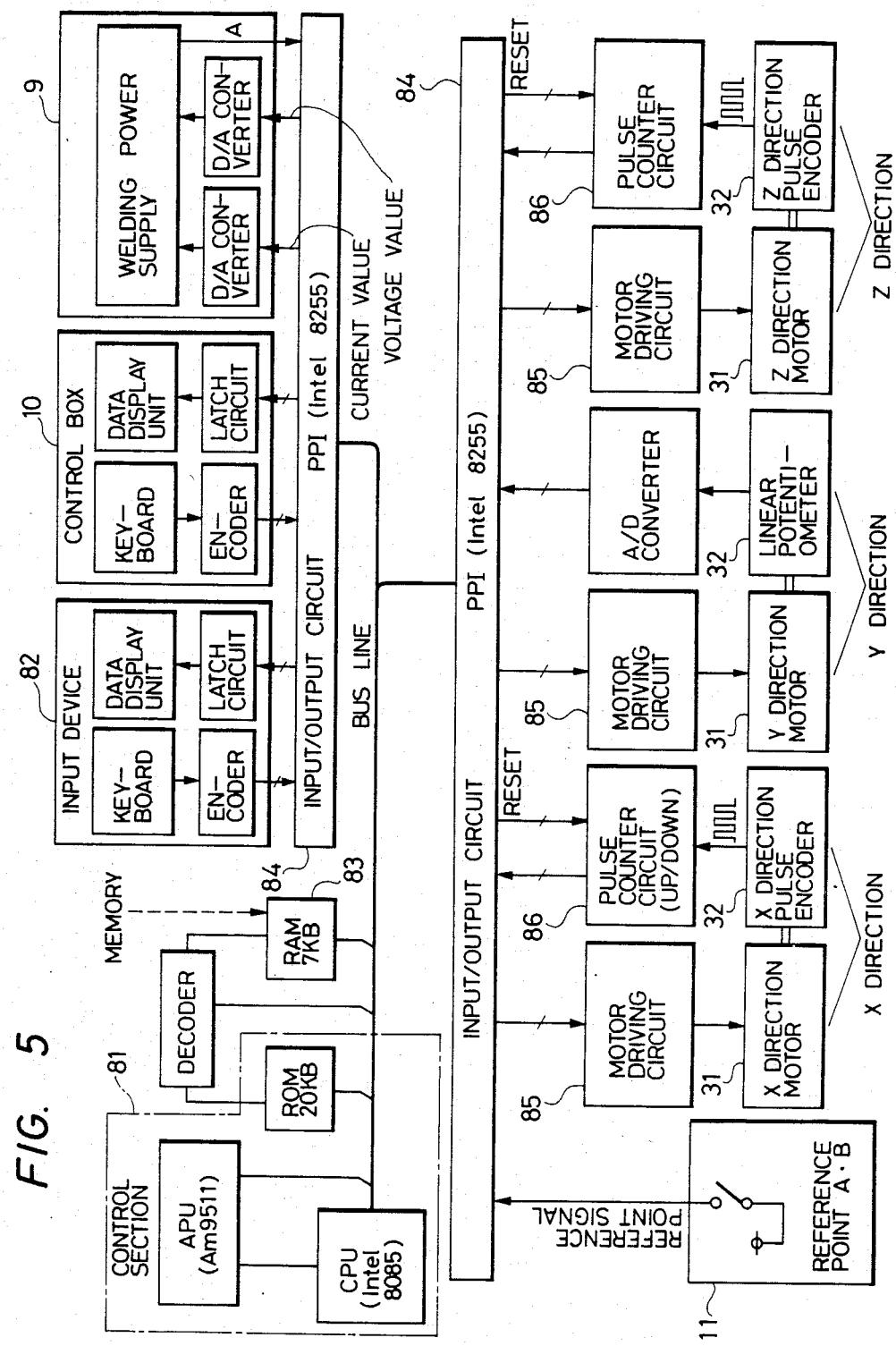
FIG. 5 is a more detailed block diagram of what is shown in FIG. 2.

FIG. 5 is a block diagram showing more detail construction of the apparatus of FIG. 2, wherein like reference numerals designate like parts in FIG. 2.

As set forth above, since it is possible with the present invention to teach a welding line in both upwardly welding directions, cause the teaching to be regenerated, and separately teach arc generating and terminating points relative to both welding directions, there is no need for mating the welding torch with the welding line, which makes possible efficient automatic upward split circumference welding.

I claim:

1. An automatic circumferential welding apparatus comprising: a guide arranged close to abutted ends of cylindrical objects; a welding head driven along said guide and equipped with a welding torch so as to apply arc welding along a circumference defined by said abutted ends while moving in a clockwise and a counter-clockwise direction around respective semicircumferential paths around said circumference; a welding power supply for supplying welding current to said welding torch; means for moving said welding head along said semicircumferential paths around said circumference and said welding torch in a direction perpendicular to said circumference; position detecting means for detecting the positions of said welding torch as it travels along said semicircumferential paths; control means for storing positions detected by said position detecting means, said control means comprising a memory for storing welding conditions established for the stored positions; and a control box having operational keys, a display unit connected to said control means, a travel direction control means for directing the welding direction of said welding head, mode selecting means for causing said welding head to be moved in at least a teaching mode wherein the welding head is taught positions to be traveled during a welding operation or a regenerative mode wherein the welding head is caused to be moved to the taught positions, a memory control means for causing said memory to store positions taught in said teaching mode, a moving means activation means for selectively activating said moving means, and a reference point setting means for moving said welding head to reference points in plural welding directions and resetting said position detecting means.

2. The automatic circumferential welding apparatus as claimed in claim 1, wherein said control means comprises a pulse counter circuit, and wherein positions detected by said position detecting means are stored in terms of number of pulses from said reference points.

3. The automatic circumferential welding apparatus as claimed in claim 2, wherein said reference point setting means comprises means for resetting pulse count numbers in said pulse counter circuit.

4. The automatic circumferential welding set as claimed in claim 1, wherein said control means comprises an input/output circuit, a welding power supply, and a control box connected to said input/output circuit and said welding power supply.

5. The automatic circumferential welding apparatus as claimed in claim 1, wherein said moving means is arranged in said welding head.

6. The automatic circumferential welding apparatus as claimed in claim 5, wherein said control means comprises a motor driving circuit for controlling said motor.

7. The automatic circumferential welding apparatus as claimed in claim 1 wherein said position detecting means comprises a pulse encoder for producing pulses indicative of the position of said welding head.

8. The automatic circumferential welding apparatus as claimed in claim 1, wherein said position detecting means comprises a linear potentiometer for detecting movement of said welding head in one direction and thereby producing a signal indicative of the position of the welding torch.

9. The automatic circumferential welding apparatus as claimed in claim 1, wherein said moving means activation means comprises a forward-backward direction control switch for moving said welding head in a first direction, an upward-downward switch for moving said welding torch in a second direction perpendicular to said first direction, and a dial for moving said welding torch in a third direction perpendicular to said first and second directions.

* * * * *